US008364682B1

(12) United States Patent
Gershony et al.

(10) Patent No.: US 8,364,682 B1
(45) Date of Patent: Jan. 29, 2013

(54) IDENTIFIER MAPPING FROM JOINED DATA

(75) Inventors: Ori Gershony, Redmond, WA (US);
Wei Zheng, Bellevue, WA (US); Andrei Pascovici, Bellevue, WA (US); Tim Hesterberg, Seattle, WA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 13/101,213

(22) Filed: May 5, 2011

(51) Int. Cl.
G06F 7/00 (2006.01)
(52) U.S. Cl. ...................................................... 707/739
(58) Field of Classification Search .................. 707/736, 707/737, 739, 741, 999.2; 714/38.1, 39, 714/45, 6
See application file for complete search history.

(56) References Cited

U.S. PATENT DOCUMENTS

| 7,689,626 B2 * | 3/2010 | Miller et al. .................. 707/783 |
| 8,069,374 B2 * | 11/2011 | Panigrahy et al. ........... 714/38.1 |
| 2008/0010497 A1 * | 1/2008 | Kronlund et al. .................. 714/6 |
| 2008/0313228 A1 * | 12/2008 | Clark et al. ................. 707/104.1 |
| 2009/0094294 A1 * | 4/2009 | Morris et al. .................. 707/202 |
| 2010/0223499 A1 * | 9/2010 | Panigrahy et al. ............. 714/19 |

OTHER PUBLICATIONS

Shulman et a., U.S. Appl. No. 12/410,972, filed Mar. 29, 2009.
Kamvysselis et al., U.S. Appl. No. 12/052,626, filed Mar. 20, 2008.
Kamvysselis et al., U.S. Appl. No. 12/052,616, filed Mar. 20, 2008.
Chan et al., "Evaluating Online Ad Campaigns in a Pipeline: Causal Models at Scale", Proceedings of ACM SIGDD pp. 7-15, 2010.

* cited by examiner

Primary Examiner — Hung T Vy
(74) Attorney, Agent, or Firm — Fish & Richardson P.C.

(57) ABSTRACT

Methods, systems, and apparatus, for refining log file join data. In one aspect, a method includes receiving first join data defining first joins of records in a first log file to records in a second log file. Each first join of a record in the first log file to a record in the second log file is based on an association of the first identifier of the record in the first log file to the second identifier of the record in the second log file. Associations of the first identifiers to the second identifiers in the first join data that meet a confidence threshold are stored in a mapping of first identifiers to second identifiers as a mapped association. For each mapped association, records that include the first identifier from the first log file are associated with records that include the second identifier from the second log file.

20 Claims, 5 Drawing Sheets

IDENTIFIER MAPPING FROM JOINED DATA

BACKGROUND

This specification relates to data management.

The Internet provides access to a wide variety of content items, e.g., video and audio files, web pages, and news articles. Such access to the content items has enabled opportunities for targeted advertising. For example, content items can be identified to a user by a search engine in response to a query submitted by the user. The query can include one or more search terms, and the search engine can identify and, optionally, rank the content items based on the search terms in the query and present the content items to the user (e.g., according to the rank). The query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also likely to be interested in the product or service featured in the advertisement. Accordingly, such targeted advertisement placement can help drive online customers to the advertiser's website.

The serving of the advertisements can be improved by evaluating the effectiveness of the advertisements. One technique for evaluating the effectiveness of an advertisement is evaluating online user behavior to determine whether online user behavior as manifested by web site visitations and search activity have increased due to the display of ads. However, to conduct this analysis, a system accesses several data logs that store data related to online user behavior and advertisements that were served to the users. Each of the data logs is keyed to different identifiers for user devices. For example, for a particular user device, a first identifier may be used in an advertisement log that stores records detailing advertisements that were served to the user device, and a second identifier may be used in session logs that stores records detailing actions taken by the user during web browsing sessions. These identifiers are not the same identifies for several reasons. First, the advertisement management system and the system that stores session information may be disparate systems that do not coordinate the assignment of user identifiers. For example, each system may have different identifier rules, e.g., the advertisement management system may assign a new identifier every three months, while the system that stores session information may assign new identifiers every month. Second, the system designers take care to protect user privacy, and thus the identifiers may not be globally unique identifiers, and the records may not store any personal identifying information (such as a user name, address, etc.). Other privacy protection measures include the redaction of personal identifying information from records, pseudo-anonymization of the information, and access controls to the user information.

While there are techniques to reconcile particular records stored in multiple logs to a single user device, the techniques may results in false-positives (matching two records when, in fact, they should not be matched) and/or false-negatives (not matching two records when, in fact, they should be matched).

SUMMARY

The subject matter of this specification relates to mapping identifiers across different log files. More specifically, log records from at least two different log files are joined using a first join process to generate a mapping of identifiers from the first log file to the second log file. The log files are then joined by a second join process that uses the mapping of identifiers.

In general, one innovative aspect of the subject matter described in this specification can be embodied in methods that include the actions of receiving first join data defining first joins of records in a first log file to records in a second log file, wherein: each record in the first log file describes a first user device event and includes a first identifier that identifies a user device; each record in the second log file describes a second user device event and includes a second identifier that identifies a user device; and each first join describes a join of a particular record in the first log file to a particular record in the second log file by an association of the first identifier of the particular record in the first log file to the second identifier of the particular record of the second log file, and represents the first type of user event of the particular record of the first log file and the second type of user event of the particular record of the second log file occurring at a particular user device, and wherein the first identifier and second identifiers are different identifiers; for each association of a first identifier to a second identifier: determining whether the association of the first identifier to the second identifier meets a confidence threshold; storing the association of the first identifier to the second identifier in a mapping of first identifiers to second identifiers only if the association meets the confidence threshold; and for each mapping of a first identifier to a second identifier, associating records that include the first identifier from the first log file with records that include the second identifier from the second log file.

These and other embodiments can each optionally include one or more of the following features. Determining whether the association of the first identifier to the second identifier meets the confidence threshold comprises: determining that the association of the first identifier to the second identifier meets the confidence threshold when the association of the first identifier to the second identifier is unique among the associations of first identifiers to second identifier in the first join data.

Determining whether the association of the first identifier to the second identifier meets the confidence threshold comprises: determining multiple associations for a first identifier to two or more second identifiers; determining a dominant association of the first identifier to only one of the two or more second identifiers; and determining that the only domination association of the first identifier to the only one of the two or more second identifiers meets the confidence threshold.

Particular embodiments of the subject matter described in this specification can be implemented so as to realize one or more of the following advantages. The mapping of identifiers from an initial joining of two or more logs results in a reduction of false-positive matches and false-negative matching failures. The mapping can be applied to the same log files that were used in the initial joining of the log files, and thus can be implemented as an independent processing step separate from the initial joining of the log files. Accordingly, existing joining techniques need not be modified to accommodate the latter mapping techniques. Additionally, the mapping of identifiers from an initial joining of two or more logs can match identifiers not initially matched because of missing records in a log file.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION 1.0 Overview

Figure 1:
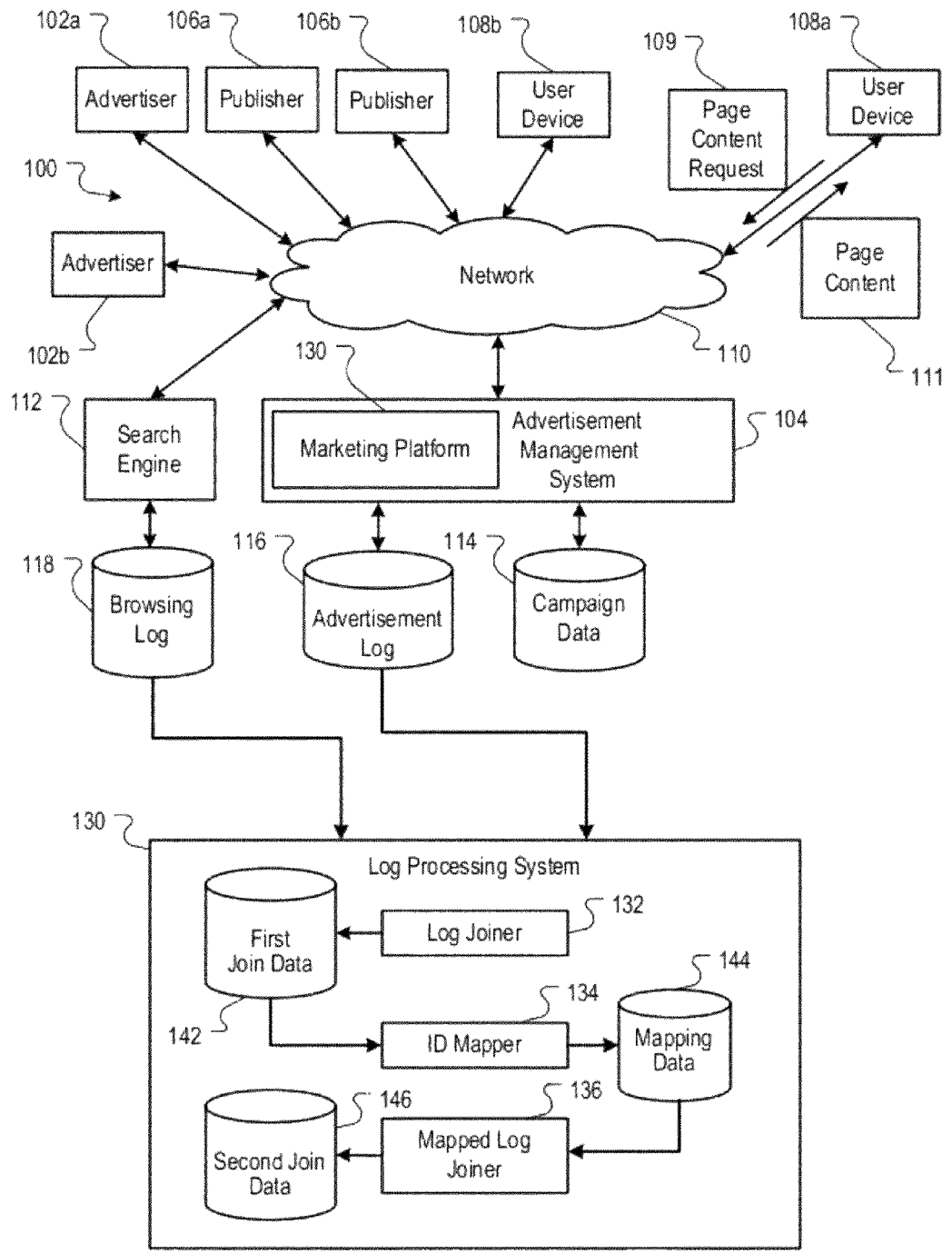
FIG. 1 is a block diagram of an example online environment.

FIG. 1 is a block diagram of an example online environment 100. The online environment 100 can facilitate the identification and serving of content items, e.g., web pages or advertisements (ads), to users. Advertisers (e.g., 102a and 102b, collectively referenced as 102), publishers (e.g., 106a and 106b, collectively referenced as 106), and user devices (e.g., 108a and 108b, collectively referenced as 108) and a search engine 112 are in data communication with an advertisement management system 104 through a network 110. The advertisement management system 104 provides advertisements for presentation with search results and publisher pages, as will be described in more detail below. Although only two advertisers (102a and 102b), two publishers (106a and 106b) and two user devices (108a and 108b) are shown, the online environment 100 may include many more advertisers, publishers and user devices.

In some implementations, the advertisers 102 can directly or indirectly, enter, maintain, and track advertisement information in the advertising management system 104. The advertisements can be in the form of graphical advertisements, such as banner advertisements, text only advertisements, image advertisements, audio advertisements, video advertisements, or advertisements combining one of more of such components, or any other type of electronic advertisement. The advertisements may also include embedded information, such as links, meta-information, and/or machine executable instructions, such as HTML or JavaScript™.

The user devices 108 submit page content requests 109 to publishers 106 or the search engine 112, and page content 111 is provided to the user device 108 in response to the request 109. The page content can include advertisements provided by the advertisement management system 104, or can include executable instructions, e.g., scripted instructions, that can be executed at the end user device 108 to request advertisements from the advertisement management system 104. Examples of the end user devices 108 include personal computers, mobile communication devices, and television set-top boxes.

The publishers 106 can use general content servers that receive requests for content (e.g., articles, discussion threads, music, video, graphics, search results, web page listings, and information feeds), and retrieve the requested content in response to the request. For example, content servers related to news content providers, retailers, independent blogs, social network sites, or any other entity that provides content over the network 110 can be used by the publisher 106.

The advertisements can be provided for presentation with content of the publishers 106. For example, in response to the advertisement requests, the system 104 sends responsive advertisements for placement with the publisher's content e.g., a web page of the publisher). The advertisements can include embedded links to landing pages, e.g., pages on the advertiser's websites, that user device 108 is directed to when an end user of the device 108 selects an advertisement presented on the publisher web page.

In some implementations, a publisher 106 can combine the requested content with one or more of the advertisements provided by the system 104. The combined page content and advertisements can be sent to the end user device 108 that requested the content as page content 111 for presentation in a viewer application (e.g., a web browser or other content display system).

The advertisements can be also provided with search results pages for the search engine 112. The search engine 112 receives queries for information from the user devices 108, and in response, the search engine 112 can retrieve relevant search results from an index of documents (e.g., web pages, images, videos, etc). Search results can include, for example, lists of web page titles, snippets of text extracted from content of the web pages, and hypertext links to the web pages, and may be grouped into a predetermined number of search results.

The advertiser 102 manages the serving of advertisements by specifying an advertising campaign. The advertising campaign can be associated with campaign data stored in a campaign data store 114, which can, for example, specify advertising budgets for advertisements, when, where and under what conditions particular advertisements may be served for presentation, and the advertisements.

The search engine 112 can submit a request for advertisements to the system 104 (or, alternatively, the user device 108, when rendering the page content 111, can submit the request in response to processing advertisement request instructions in the search results page). The request may include a number of advertisements desired. This number may depend on the search results, the amount of screen or page space occupied by the search results, and the size and shape of space reserved for the advertisements. The request for advertisements may also include the query (as entered, parsed, or modified), information based on the query (such as geo-location information, whether the query came from an affiliate and an identifier of such an affiliate), and/or information associated with, or based on, the search results. The advertisement management system 104 provides the advertisements in response to the request. The advertisements that are provided are rendered on the search results page.

The advertisers 102, publishers 106, and user devices 108 can also provide usage information to the advertisement management system 104 and the search engine 112. For advertisements, the usage information can include measured or observed end user behavior related to advertisements that have been served, such as, for example, whether or not a selection of an advertisement and/or an other action related to an advertisement has occurred. This information is stored in a first log, e.g., an advertisement log 116, which includes records that are each associated with a first user identifier, e.g., a first cookie identifier provided by the advertisement management system 104. The system 104 performs financial transactions, such as crediting the publishers 106 and charging the advertisers 102 based on the usage information. Such usage information can also be processed to measure performance metrics, such as click-through rates (CTR) of advertisements and/or campaigns, and conversion rate of advertisements and/or campaigns.

For example, when one or more advertisements are shown on a web page at a user device 108, the time and the location (e.g., the URL) of the advertisement impression can be recorded in addition to which IP address was used to access the web page. Additionally, a first identification (ID) number, e.g., the first cookie identifier, and event data (e.g., clicks and data detailing actions taken at the user device 108) can also be recorded. Typically, the first cookie identifier is not associated with personally-identifiable information of a user of a user device.

The search engine 112 stores information relating to browsing sessions in a browsing log 118. For example, a toolbar interface to the search engine 112 may generate, for each user device 108, a user identifier, e.g., a second cookie identifier, and provide information detailing browsing events for the user device. Information about the Internet browsing sessions for each user device 108 includes, for example, the time and date the user device 108 accesses a web page, the web page accessed (e.g., the URL), and an identification (ID) number (e.g., the second cookie identifier). Typically, the second cookie identifier is not associated with personally-identifiable information of a user of a user device.

In some implementations, the advertisement management system 104 includes a marketing platform 130 that enables the advertiser or other users of the system 104 to measure and review effectiveness of an advertisement and a campaign for the advertisement. The marketing platform can be network based and be shared by authorized users to obtain information about the effectiveness of the ad and ad campaign before, during, or after the completion of the campaign. For example, the authorized users can share and exchange information about effectiveness an advertisement and a campaign dynamically during the campaign to enable the users to adjust the campaign or the advertisement to improve the effectiveness based on the measured results.

As described above, neither the advertisement log 116 nor the browsing log 118 by itself contains all the information needed to identify which users were exposed to the advertisement and the actions they took prior to and after exposure to the advertisements. This identification can be used, for example, to help determine how on-line behaviors of users are affected by content (e.g., ads) that is presented. For example, the behavior of users that observed particular advertisements can be compared to the behavior of users that did not observe the advertisements. The behavioral determinations then can be used to adjust the advertisements that are presented to other users who have similar demographics or determined behaviors.

Typically the identification does not personally identify a particular user. Instead, identifiers set by the search engine (e.g., a cookie) and identifiers set by the advertisement management system 104 (e.g., another cookie) are randomly generated numbers and are not associated with personally identifiable information (PII) that can be used to reveal the identity of a particular user.

2.0 Log Processing

In some implementations, a log processing system 130 is used to facilitate this analysis. The log processing system includes a log joiner 132, an ID mapper 134, and a mapped log joiner 136. Each of the log joiner 132, ID mapper 134, and mapped log joiner 136 can be implemented in software on a data processing apparatus and a memory storage device. The data processing apparatus can be one or more computer devices in data communication, and memory storage device can be one or more storage devices in data communication with the data processing apparatus. The three functional blocks are illustrative only, and different architectures can be used. The log joiner 132 can implement a log joining process to generate the first join data.

In operation, the log joiner 132 generates first join data 142 that defines first joins of records in a first log file (e.g., the browsing log 118) to records in a second log file (e.g., the advertisement log 116). A variety of joining algorithms can be used.

The first join data describes first joins of records in the first log file to records in the second log file. For example, each first join describes a join of a particular record in the first log file to a particular record in the second log file by an association of the first identifier of the particular record in the first log file to the second identifier of the particular record of the second log file. Thus, for the advertising log 116 and the browsing log 118, records are matched by the respective first and second cookie identifiers. Each join is representative of the first type of user event of the particular record of the first log file (e.g., the presentation of an advertisement, or a selection of an advertisement) and the second type of user event of the particular record of the second log file (e.g., the request for a particular web page) occurring at a particular user device.

Figure 2:
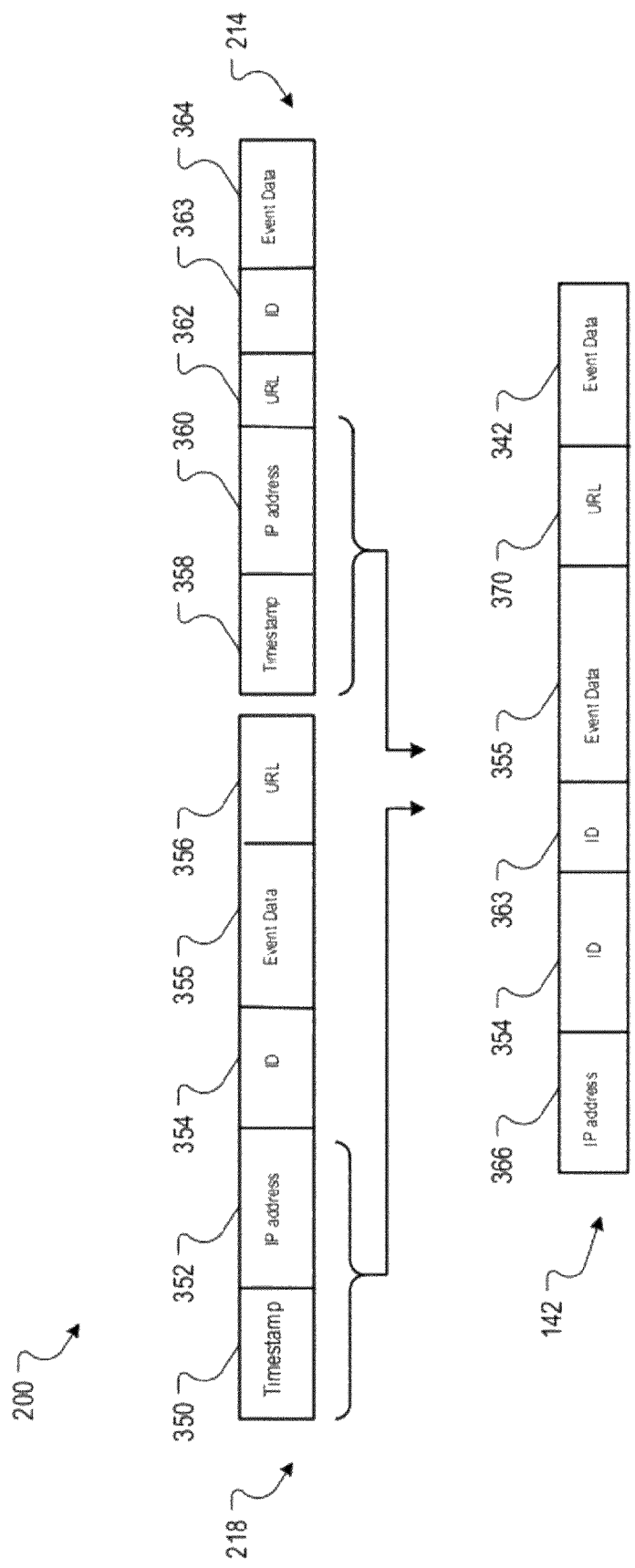
FIG. 2 is a block diagram of records from first and second log files, and first join data indicating a join of the records.

FIG. 2 is a block diagram 200 of records 214 and 218 from first and second log files, and first join data 142 indicating a join of the records. Although only three records are shown to illustrate an example join operation, typically many more records are joined.

In this example, the record 218 is a record from the browsing log 118, and includes a browsing timestamp 350, a browsing IP address 352, a user ID 354, a URL 356 and event data 355. The record 214 is from the advertising log 116, and includes a content timestamp 358, a content IP address 360, a URL 362, a user ID 363, and event data 364. The two records are joined from a joining process to generate the first joining data 142 that represents a first matching of the two records. Here, the join of the records form a merged data record. The joining is based on, for example, respectively matching the IP address 352 with the IP address 360 of the records, and the timestamp 350 with the timestamp 358 of the records (within a predetermined window). Other joining algorithms can also be used, such as a match being only within a threshold difference of the browsing timestamp 350 and the content time stamp 358; or a statistical match based on the browsing IP address 352 and the content IP address 360, the browsing URL 356 and the content URL 362, and a threshold difference of the browsing timestamp 350 and the content time stamp 358, etc.

For the matched records 214 and 218, the join data 142 includes an IP address 366, a user ID 354, a user ID 363, event data 355, a URL 370, and event data 342 In some implementations, the merged record 142 can include additional information. For example, the merged record 142 could contain each data element of both the records 214 and 218.

The example of FIG. 2 shows a merger of two records with a one-to-one correspondence. However, depending on the reporting processed for events (e.g., the number of events for each record and what types of events are recorded), the associations of records with identifier pairs can be N:1. For example, a record in the first log file 116 with a first identifier that corresponds to a second identifier in the second log file may also be associated with two or more of these records in the second log file 118. For example, a particular record in the first log file 116 may correspond to a presentation of an advertisement for a web page server in response to a particular URL request at a particular user device. In the second long file, two records may correspond to the record in the first log file, e.g., a first recording indicating the particular URL was requested in response to a selection of a search result, and a second record indicating a URL request to a landing page in response to a selection of the advertisement.

2.1 Identifier Mapping

The first join data 142 can include data resulting from false positive matches of records, and can also omit data resulting from false negative failures to match records. For example, two user devices may share a common IP address because they use the same router. If the devices are being used at the same time, this may lead to false positive matches of identifiers in the log files. A large time difference between records of the respective log files may lead to false negative matches. Likewise, an event record in one log file not having a matching record in the other log file may lead to a false negative. Because of these errors, there may be occurrences in the first join data in which a first identifier from the first log file is matched with two or more identifiers from the second log file. Likewise, there may be occurrences in the first join data in which a second identifier from the second log file is matched with two or more identifiers from the first log file.

To improve the accuracy of the join, the ID mapper 134 is used to generate mapping data 144 from the first join data. The mapping data defines associations of first identifiers to second identifiers, and each association is determined from the first join data. As will be described in more detail below, each association of a first identifier to a second identifier is subject to the association of the first identifier to the second identifier meeting a confidence threshold, e.g., a measure of the confidence that the association is correct, and is not a false-positive.

Figure 3:
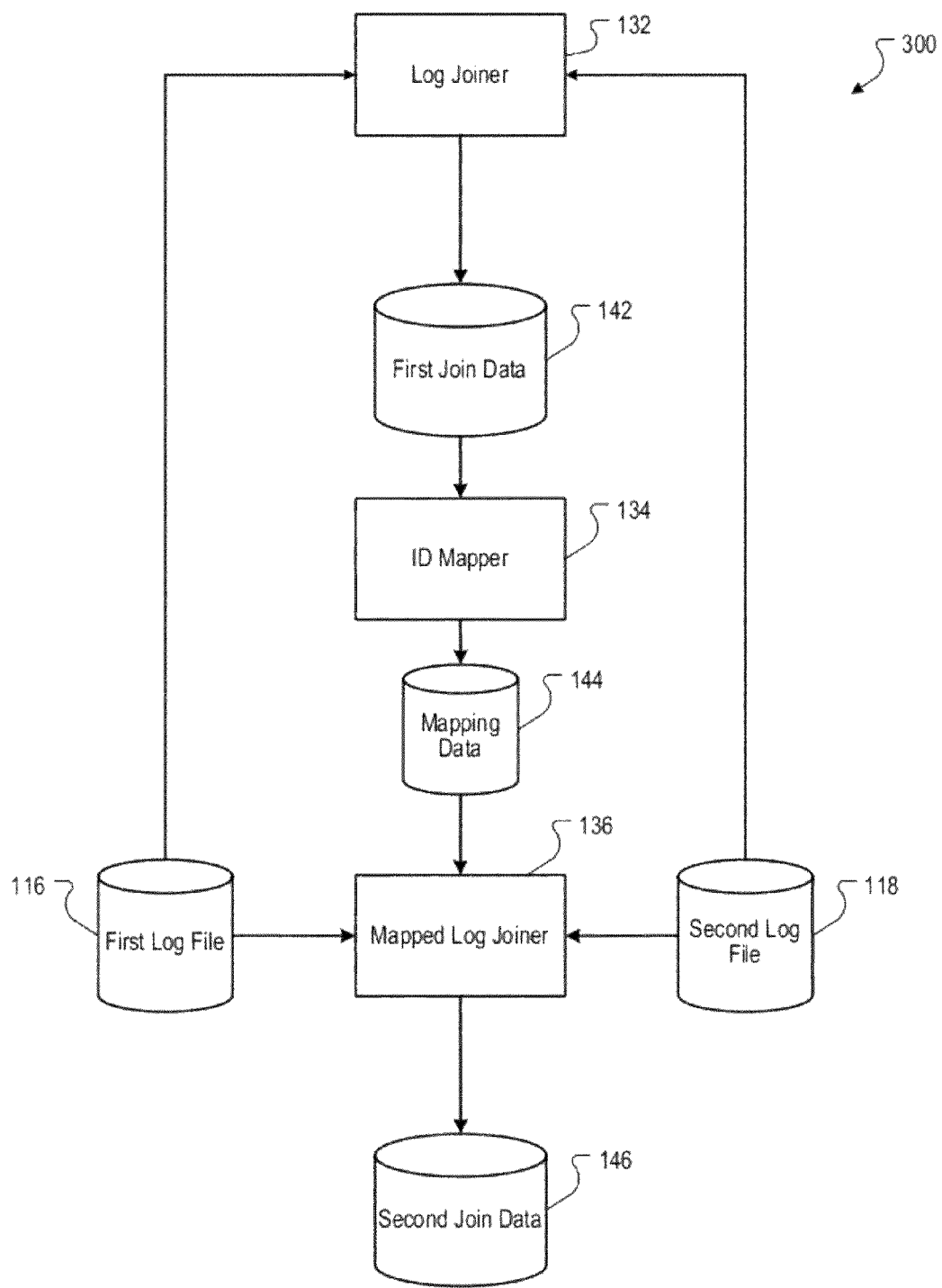
FIG. 3 is a block diagram of a log processing system.

FIG. 3 is a block diagram 300 of the log process system. As described above, the log joiner 132 performs a join on the first log file 116 (e.g., the advertising log 116) and the second log file 118 (e.g., the browsing log 118) based on matching records from the first log file 116 to records of the second log file 118. The result of the join is the first join data 142. A variety of algorithms to determine the joins based on matching of data from respective records in the log files 116 and 118 can be used.

2.2 Confidence Measures and Mapping Data

The ID mapper 134 maps high confidence associations of identifiers of records in the first log file 116 with identifiers of records in the second log file 118. As described above, the first join data 142 may include false positive matches and may not include matches of records that should be matched due to false negatives. There is a variety of ways that the confidence of an association can be determined. Examples include a binary confidence threshold based on a unique association; a confidence measure based on a dominant association; and a confidence measure based, in part, on a lifetime overlap of the respective identifiers.

For a confidence measure based on a unique association, the association of the first identifier to the second identifier meets the confidence threshold when the association of the first identifier to the second identifier is unique among the associations of first identifiers to second identifier in the first join data. For example, assume the associations of identifiers in the first join data are as illustrated in Table 1 below for five sample record associations from the first and second logs:

TABLE 1

| ID (363) | Record No. | ID (354) | Record No. |
|---|---|---|---|
| 000333 | 97 | 000777 | 993 |
| 000333 | 88 | 000777 | 1039 |
| 000333 | 190 | 000777 | 61 |
| 000333 | 12 | 000777 | 838 |
| 000333 | 443 | 001111 | 334 |

Here, the confidence measure for all associations with the identifier 000333 in the second log, and all associations with the identifiers 000777 and 00111 in the first log, would not meet the confidence threshold, as the associations are not unique, i.e., the identifier 000333 is associated with two identifiers—000777 and 001111, and thus none of the identifiers 000333, 000777 and 001111 are uniquely associated. Accordingly, the mapping of the identifier 000333 to the identifier 000777 and the mapping of the identifier 000333 to the identifier 001111 are not stored in the mapping data 144. This results in a coarse filtering of the first join data 142.

For a confidence measure based on a dominant association, the confidence measure reflects the dominance of an association of an identifier relative to other associations of the identifier. The association with the highest dominance (and, optionally a dominance that exceeds a minimum dominance measure) is selected as the association.

For example, with respect to Table 1 above, the association of the identifiers 000333 and 000777 occurs four times, while the association of the identifiers 000333 and 001111 occurs only once. Assuming that these are all the associations of these three particular identifiers, the dominance can be measured, for example, based on counts. Here the count of the associations of 000333 and 000777 is four, while the count of 000333 and 001111 is one. Thus, the association of 000333 and 000777 is the most dominant, and is stored in the mapping data, and the association of 000333 and 001111 is not stored in the mapping data. This can be interpreted as the match between the identifiers 000333 and 001111 being a false positive.

In some implementations, the association can also be required to have a minimum count, and/or exceed other association counts by a relative amount. For example, for the ID mapper to select an association as a dominant association, the association may also be required to have occurred a minimum number of times (e.g., N times), and the ratio of N to the next highest association count (e.g., M), must be greater than a minimum ratio, Q. For example, assume N is 3, and Q is 2 (other values can be used). The 000333 and 000777 would be selected as the dominant interpretation, as the number of associations is 4 (i.e., greater than N), and the ratio of 4/M is 4 (i.e., 4/1=4), which meets the minimum ratio of 2.

In some implementations, confidence measures are based, in part, on a lifetime overlap of the respective identifiers. As described, the identifiers in the log files may be cookie identifiers that have expiration times. For example, the cookies that are used for identifiers in the advertisement log file 116 may have a lifetime of two months, while the cookies in the browsing log file 118 may have a lifetime of one month. At the expiration of the lifetime of a cookie, a new cookie is set on the user device.

With respect to Table 1, assume that the cookie for the identifier 001111 does not have a lifetime that overlaps with the lifetime of cookie for the identifier 000333. Accordingly, the join is determined to be a false positive, as a single user device could not have provided the cookies with identifiers 000333 and 001111 for any co-occurring events, and the association is not stored in the map data. Thus, an association of a first identifier to a second identifier is valid only if the associations occur within the overlap of the lifetimes of the first identifier and the second identifier. Associations occurring outside of the overlap of the lifetimes of the first identifier and the second identifier automatically have low confidence and are not further evaluated.

Conversely, assume that the cookies for identifiers 001111 and 000777 and 000333 both have lifetimes that overlap with the lifetime of the cookie 000333. For example, a first cookie for the identifier 000777 may have expired during the lifetime of the cookie with the identifier 000333. Accordingly, a new cookie with the identifier 001111 is set to replace the cookie 000777. In this situation, both associations between the identifiers 000333 and 000777, and 000333 and 001111 are stored.

In some implementations, various confidence measure techniques can be combined. For example, the dominant association technique can be combined with the lifetime overlap technique, and dominant association calculations can be limited to identifiers with lifetime overlaps.

Other confidence measuring techniques can also be used. For example, the matching of events in the respective records can be compared and if the events do not match with a minimum confidence, the association can be discounted (e.g., the particular association between the two identifiers for the two records may not be used when determining a dominant association). For example, assume the records 97 and 993 referenced in Table 1 have different URLs, and the timestamps of the two records differ by a 40 seconds. The identifier mapper 134 may have a rule implemented in which records with different URL's may have a time stamp difference of no more than 15 seconds to be considered a valid match. Accordingly, the match between the records 97 and 993 is discounted. Regardless, the association may still be considered to be valid based on a dominant association with N=3 and Q=2, as the number of association that are considered is three (i.e., the number of associations is at least N (3), and 3/M=3, which is greater than Q (2)).

All identifier associations from the first join data 142 with confidence measures that meet a confidence threshold are stored in the mapping data 144. For example, with respect to Table 1, the mapping data would have at least one entry of a mapping of the identifier 000333 to 000777, as this association meets a confidence threshold.

2.3 Mapped Log Joiner and Second Join Data

The mapped log joiner 136 uses the mapping data 144 to create second join data 146. The second join data 146, for example, can be similar to the first join data 142, except that the records are joined according to only the associations in the mapping data 142.

The second join data 146 describes second joins of particular records in the first log file 116 to particular records in the second log file 118. Each second join is based on an association of the first identifier of the particular record in the first log file 116 to the second identifier of the particular record of the second log file, and each association described by each second join is an association of first identifiers to second identifiers stored in the mapping data 144.

The mapped log joiner 136, using the mapping data 144, thus reduces the likelihood of occurrences of false positives and false negatives in the second join data 146 relative to the first join data 142. The second join reduces the false negatives by joining those records of the first log file 116 to the second log file 118 that should have been matched but were not matched in the first join data 142. Likewise, the second join reduces the false positives by not joining those records of the first log file 116 to the second log file 118 that were incorrectly matched in the first join data 142.

Described below are two example second join processes. The first example join process associates records from the first log file 116 and from the second log file 118 based upon mapped associations of first identifiers to second identifiers stored in the mapping data 144. The second example second join process joins records from the first log file and from the second log file based upon the mapped associations of first identifiers to the second identifiers stored in the mapping data 144.

Table 2 depicts a first example of first join data for identifiers 00333 and 000555 from the second log file 118 with identifiers 000777, 000111 and 006784 from the first log file. Assume that the first match of 000333 and 006784 is a false positive. Assume that the third and fourth rows from the bottom for the record with the identifiers 000555 and 001111 were not matched due to a false negative, as the record 9934 in the second log file 118 should have been matched to record 1000 in the first log file. Also, assume that the last two rows for the record with the identifiers 000555 and 001111 were not matched due non-overlapping lifetimes of the identifiers for the records 1313 and 2626, e.g., the lifetime of the identifier 001111 for the record 2626 does not overlap with the lifetime of the identifier 000555 for the record 1313.

TABLE 2

| ID (363) | Record No. | ID (354) | Record No. |
|----------|------------|----------|------------|
| 000333 | 97 | 000777 | 993 |
| 000333 | 88 | 000777 | 1039 |
| 000333 | 190 | 000777 | 61 |
| 000333 | 12 | 000777 | 838 |
| 000333 | 443 | 006784 | 398 |
| 000555 | 999 | 001111 | 9883 |
| 000555 | 1100 | 001111 | 7331 |
| 000555 | 9934 | NULL | NULL |
| NULL | NULL | 001111 | 1000 |
| 000555 | 1313 | NULL | NULL |
| NULL | NULL | 001111 | 2626 |

The ID mapper 134 processes the first join data 142 and generates mapping data with the following associations: 000333 and 000777, and 000555 and 001111. Table 3 depicts the mapping data.

TABLE 3

| ID (363) | ID (354) |
|----------|----------|
| 000333 | 000777 |
| 000555 | 001111 |

The association of 000333 and 006784 is not generated, as it does not meet a confidence measure (e.g., the dominant association is 000333 and 000777). The mapped log joiner 136 uses the mapping data to generate the second join data 146.

In the first example second join process, the mapped log joiner 136 accesses the mapping data 144 illustrated in Table 3 and the first and second log files 116 and 118 to associate records from the log files to the mapped associations, which is illustrated in Table 4 below. As will be described below, the record 1313 is associated with paired identifiers 000555 and 001111, while record 2626 is not associated with paired identifiers.

TABLE 4

| Association No. | ID (363)-ID (354) | Record No. |
|---|---|---|
| 1 | 000333-000777 | 97, 88, 190, 12, 443, 993, 1039, 61, 838 |
| 2 | 000555-001111 | 999, 1100, 9934, 1313, 9883, 7331, 1000 |

The mapped log joiner 136 generates associations of records for each mapping of a first identifier to a second identifier. To generate the associations of records to mapped associations, the mapped log joiner 136 selects a mapped association of a first identifier to a second identifier from the mapping data. The mapped log joiner 136 uses the association of the first identifier to the second identifier as a key to the records of the first log file 116 and to the records of the second log file 118, and associates the particular records that include the first identifier from the first log file 118 with the particular records that include the second identifier from the second log file.

For example, the records 993, 1039, 61 and 838 all having the identifier 000777 from the second log file 118 are associated with the mapped association of 000333 with 000777. Similarly, the records 97, 88, 190, 12 and 443, all having the identifier 000333 from the first log file 116 are associated with the mapped association of 000333 with 000777. The association of records to mapped association of first identifier to a second identifier is shown in Table 4. The process is repeated for the mapped association of 000555 to 001111.

Accordingly, non-matching records can still be associated with the corresponding mapped association. For example, despite the negative match of records 9934 and 1000, the records 9934 and 1000 are still associated with the mapped association of 000555 with 001111, as shown in Table 4.

However, in some implementations, if the non-matching records are not matched due to the meeting of an explicit constraint (e.g., the non-overlapping lifetimes of their respective identifiers), then the mapped log joiner 136 will not associate the records. Thus the non-matching of records 1313 and 2626 does not result in record 2626 being associated with the mapped association of 000555 to 001111, because the lifetime of the identifier for record 2626 does not overlap with the lifetime of the identifier 000555.

The second join data 146 represented in Table 4 can be used, for example, to recover missing information of a record associated with an identified user. The missing information of records associated with a user can be recovered from the other records associated with a user. For example, if the records of the second log file 118 were missing the URL information for the user 000333-000777, the missing information could be replaced by the URL information of the records of the first log file 116 for the user 000333-000777. The recovery of missing information for a user can enable an improved joining of the records for the user.

In a second example second join process that operates on the data of Table 2, the mapped log joiner 136 accesses the mapping data 144 depicted in Table 3 and the first and second log files 116 and 118 to generate the second join data 146, which is illustrated in Table 5 below. The second example second join process can be used for first join data 142 that describes a correspondence of records by identifiers from the first and second log files 116 and 118. That is, the second example second join process produces second join data 146 representing a correspondence between records of the first log file 116 to records of the second log file 118, based upon the mapping data 144. For example, the first row of table 5 indicates that record number 97 with an identifier 000333 from the first log file 116 corresponds to the record number 993 from with the identifier 000777 from the second log file 118.

TABLE 5

| ID (363) | Record No. | ID (354) | Record No. |
|---|---|---|---|
| 000333 | 97 | 000777 | 993 |
| 000333 | 88 | 000777 | 1039 |
| 000333 | 190 | 000777 | 61 |
| 000333 | 12 | 000777 | 838 |
| 000333 | 443 | 000777 | 838 |
| 000555 | 999 | 001111 | 9883 |
| 000555 | 1100 | 001111 | 7331 |
| 000555 | 9934 | 001111 | 1000 |
| 000555 | 1313 | NULL | NULL |
| NULL | NULL | 001111 | 2626 |
| NULL | NULL | 006784 | 398 |

In the second join data 146, the false positive association of 000333 and 006784 is eliminated. Additionally, records 9934 in the second log file 118 and the 1000 in the first log file 116 are joined, eliminating the false negative. To generate the second join data 146, the mapped log joiner 136 implements a join process similar to the join processes used in the log joiner 132, but subject to the associations in the mapping data 144 as a constraint. For example, the mapped log joiner 136 can accept matches in the first join data 142 that conform to the identifier associations in the mapping data 144. With respect to Table 2, for example, the joins defined in rows 1-4, 6 and 7 of Table 2 are accepted. Thereafter, the record 443 in the second log file 118 is checked against records in the first log file 116 that include the identifier 000777 for possible matches. As shown in Table 5, the record 443 is also determined to match the record 838, e.g., the record 838 in the first log file 116 corresponds to two records (records 12 and 443) in the second log file 118.

Additionally, the records 9934 and 1000 are also processed, and the mapped log joiner 136 determines that the records match. However, the records 1313 and 2626 are not joined, as indicated by the NULL values, because the lifetimes of their respective identifiers do not overlap. Finally, the record 006784 in the first log file 116 is determined to not match any records in the second log file 118, as indicated by the NULL values.

The second join data 146 can be used, for example, to compare the behavior of users that observed particular advertisements to the behavior of users that did not observe the particular advertisements. For example, the searches and navigations of users that observed particular advertisements can be compared to the searches and navigations of users that did not observe the particular advertisements. Such comparisons allow advertisers to determine the effectiveness of advertisements and campaigns in achieving the advertiser's goals.

For example, for each identifier in the advertising log 116 and browsing log 118 (the second and first logs, respectively), an anonymized user history can be reconstructed. The user histories can be aggregated and partitioned according to users that received particular advertisements and users that did not receive the particular advertisements, and respective metrics can be measured from each partitioned group of histories.

Although the above description uses an example implementation in the context of advertising and browsing logs, the features described above are not limited to advertising and browsing records. For example, any two data sets that are joined by an initial join can be mapped according to key identifiers, and the mapping can be processed to retain only associations of the key identifiers that meet one or more confidence measures. Thereafter, the two data sets can be joined using the mapping of retained key identifiers from the first join as a constraint to reduce the occurrence of false positives and false negatives.

3.0 Example Process Flow

Figure 4:
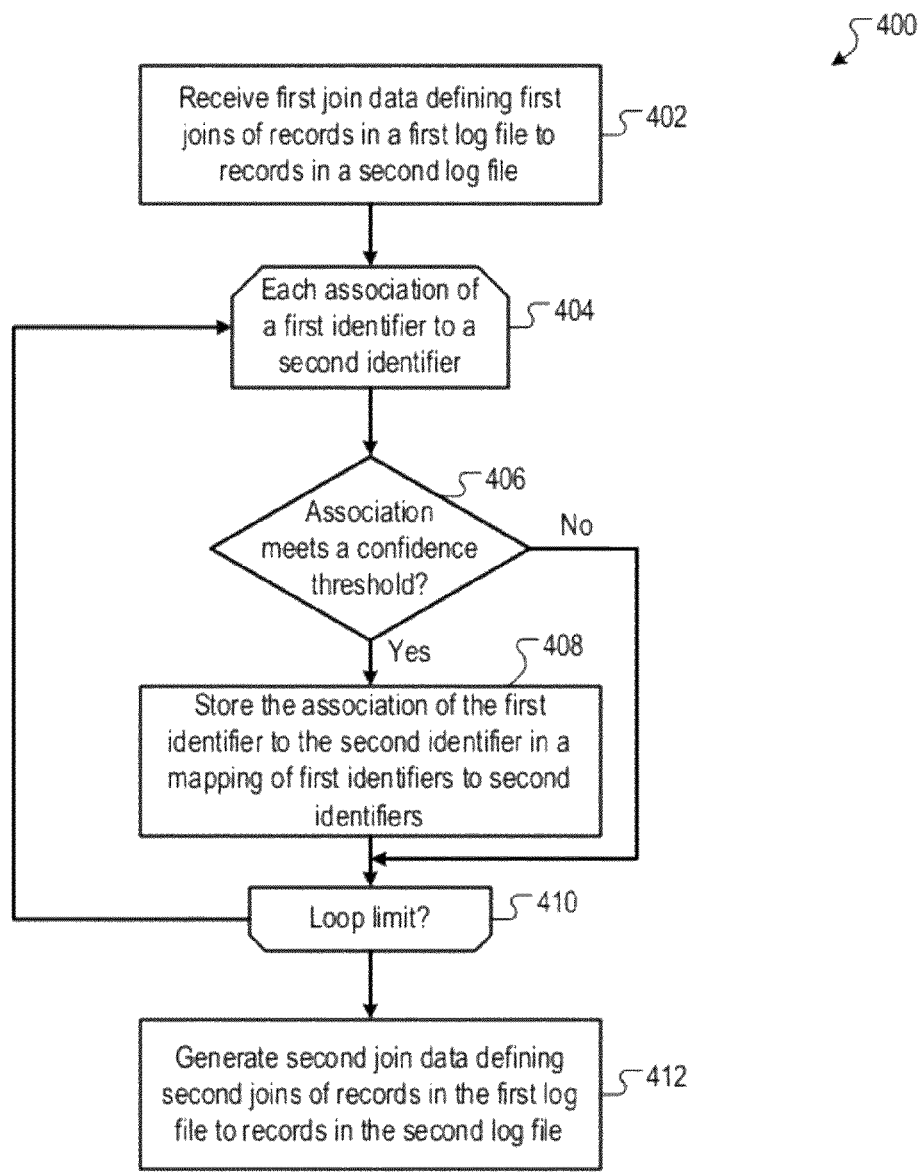
FIG. 4 is a flow diagram of an example process of creating mapping data from first join data.

FIG. 4 is a flow diagram of an example process 400 of creating mapping data from first join data. The process 400 can be implemented in the ID mapper 134 and the mapped log joiner 136 of FIGS. 1 and 3, or in other computer systems.

The process 400 receives first join data defining first joins of records in a first log file to records in a second log file (402). Each record in the first log file describes a first user device event and includes a first identifier that identifies a user device, and each record in the second log file describes a second user device event and includes a second identifier that identifies a user device. Each first join describes a matching of a particular record in the first log file to a particular record in the second log file by an association of the first identifier of the particular record in the first log file to the second identifier of the particular record of the second log file. The join is representative of the first type of user event of the particular record of the first log file and the second type of user event of the particular record of the second log file occurring at a particular user device. As the identifiers are typically from two different systems, the first identifier and second identifier are different identifiers.

For association of a first identifier to a second identifier (404), the process 400 determines whether the association meets a confidence threshold (406). For example, the process can use a binary confidence threshold based on a unique association, a confidence measure based on a dominant association, or a confidence measure based, in part, on a lifetime overlap of the respective identifier.

If the association meets a confidence threshold, the process 400 stores the association of the first identifier to the second identifier in a mapping of first identifiers to second identifiers (408).

The process determines if a loop limit is met, e.g., if there are additional associations of first identifiers to second identifiers to process (410). If so, the process 400 selects the next association and processes the association as described above.

If there are no more associations, the process 400 can, for example, generate second join data defining second joins of records in the first log file to records in the second log file (412). Each second join describes a join of a particular record in the first log file to a particular record in the second log file by an association of the first identifier of the particular record in the first log file to the second identifier of the particular record of the second log file. Because the associations are constrained by the mapping data 144, each association described by each second join is an association stored in the mapping of first identifiers to second identifiers.

4.0 Additional Implementation Details

Figure 5:
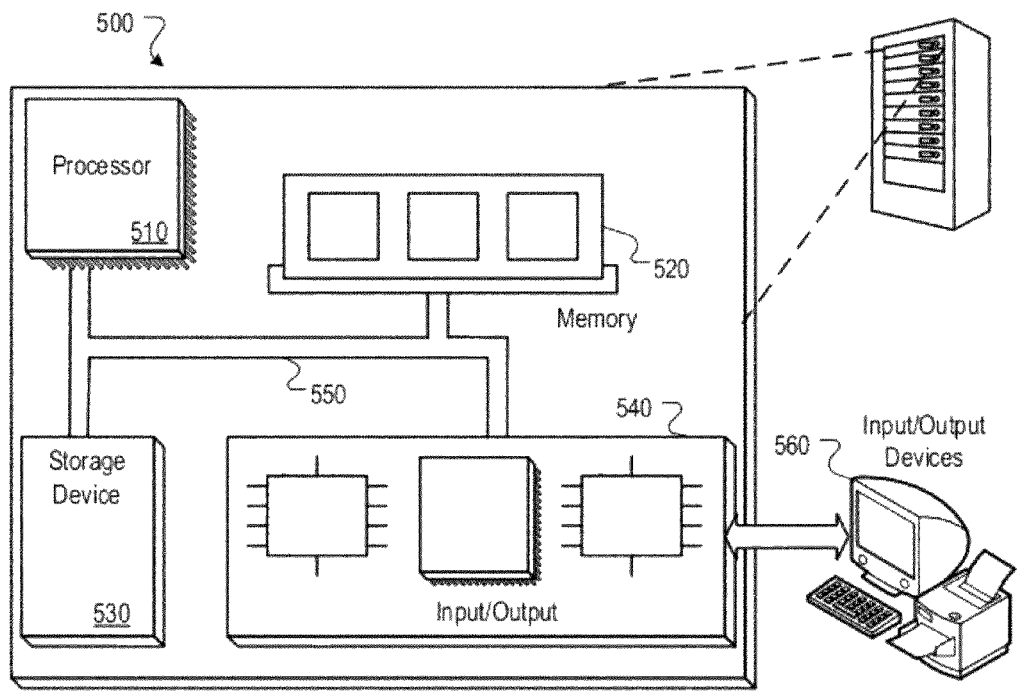
FIG. 5 is a block diagram of an example computer system that can be used to implement the processes and systems described with respect to FIGS. 1-4.

FIG. 5 is a block diagram of an example computer system 500 that can be used to implement the processes and systems described with respect to FIGS. 1-4. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a non-transitory computer-readable medium, i.e., tangible storage medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 1100. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

The merged log file refining system 400 can be realized by instructions that upon execution cause one or more processing devices to carry out the processes and functions described above. The merged log file refining system 400 can be implemented in a distributed manner over a network, such as a server farm, or can be implemented in a single computer device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    receiving, by a data processing apparatus, first join data defining first joins of records in a first log file to records in a second log file, wherein:
        each record in the first log file describes a first user device event and includes a first identifier that identifies a user device;
        each record in the second log file describes a second user device event and includes a second identifier that identifies a user device; and
        each first join describes a join of a particular record in the first log file to a particular record in the second log file by an association of the first identifier of the particular record in the first log file to the second identifier of the particular record of the second log file, and represents the first type of user event of the particular record of the first log file and the second type of user event of the particular record of the second log file occurring at a particular user device, and wherein the first identifier and second identifier are different identifiers;
    for each association of a first identifier to a second identifier:
        determining, by the data processing apparatus, whether the association of the first identifier to the second identifier meets a confidence threshold;
        storing, in a storage device, the association of the first identifier to the second identifier in a mapping of first identifiers to second identifiers only if the association meets the confidence threshold; and
    for each mapping of a first identifier to a second identifier, associating, by the data processing apparatus, particular records that include the first identifier from the first log file with particular records that include the second identifier from the second log file.

2. The method of claim 1, wherein associating particular records that include the first identifier from the first log file with particular records that include the second identifier from the second log file comprises:
    generating second join data defining second joins of records in the first log file to records in the second log file, wherein each second join describes a join of a particular record in the first log file to a particular record in the second log file by an association of the first identifier of the particular record in the first log file to the second identifier of the particular record of the second log file;
    wherein each association described by each second join is an association stored in the mapping of first identifiers to second identifiers.

3. The method of claim 2, wherein:
    the first user device event is an advertisement presentation of an advertisement, and each record in the first log files includes a timestamp, a uniform resource locator (URL), and an internet protocol (IP) address of a user device, and the first identifier is an identifier that identifies the user device to an advertisement server that serves advertisements;
    the second user device event is a browsing history records, and each record in the second log files includes a timestamp, a URL, and an IP address of the a user device, and the second identifier is an identifier that identifies the user device to system that collects browsing history events of user devices.

4. The method of claim 3, wherein determining whether the association of the first identifier to the second identifier meets the confidence threshold comprises:
    determining that the association of the first identifier to the second identifier meets the confidence threshold when the association of the first identifier to the second identifier is unique among the associations of first identifiers to second identifier in the first join data.

5. The method of claim 3, wherein determining whether the association of the first identifier to the second identifier meets the confidence threshold comprises:
    determining multiple associations for a first identifier to two or more second identifiers;
    determining a dominant association of the first identifier to only one of the two or more second identifiers; and
    determining that the only domination association of the first identifier to the only one of the two or more second identifiers meets the confidence threshold.

6. The method of claim 5, wherein determining a dominant association of the first identifier to only one of the two or more second identifiers comprises:
    determining, for each association of the first identifier to a second identifier, a count of the associations; and
    selecting as the dominant association the association for which a highest count is determined.

7. The method of claim 3, wherein:
    each of the first identifiers and second identifiers have respective identifier lifetimes; and
    determining whether an association of a first identifier to a second identifier meets a confidence threshold comprises:
        determining a lifetime overlap from the respective identifier lifetimes of a first identifier associated with a second identifier in the first join data; and
        analyzing only the records in the first and second log files with respective timestamps that occur within the lifetime overlap.

8. The method of claim 7, wherein analyzing only the records in the first and second log files with respective timestamps that occur within the lifetime overlap comprises:
    determining that the association of the first identifier to the second identifier meets the confidence threshold when:
    the association of the first identifier to the second identifier is unique among the associations of first identifiers to second identifier in the first join data; and
    a join of a particular record in the first log file to a particular record in the second log file described by the association of the first identifier to the second identifier occurs within the lifetime overlap.

9. The method of claim 2, wherein:
    each of the first identifiers and second identifiers have respective identifier lifetimes; and
    generating second join data defining second joins of records in the first log file to records in the second log file comprises:

determining a lifetime overlap from the respective identifier lifetimes of a first identifier associated with a second identifier mapping of first identifiers to second identifiers; and associating only the records in the first log file with the first identifier and records in the second log file with the second identifier only if their respective timestamps occur within the lifetime overlap.

10. The method of claim 2, wherein each second join describes a matched data record without the first identifier of the particular record in the first log file and without the second identifier of the particular record in the second log file.

11. A system comprising:
a data processing apparatus configured to perform operations comprising:
receiving first join data defining first joins of records in a first log file to records in a second log file, wherein:
each record in the first log file describes a first user device event and includes a first identifier that identifies a user device;
each record in the second log file describes a second user device event and includes a second identifier that identifies a user device; and
each first join describes a join of a particular record in the first log file to a particular record in the second log file by an association of the first identifier of the particular record in the first log file to the second identifier of the particular record of the second log file, and represents the first type of user event of the particular record of the first log file and the second type of user event of the particular record of the second log file occurring at a particular user device, and wherein the first identifier and second identifiers are different identifiers;
for each association of a first identifier to a second identifier:
determining whether the association of the first identifier to the second identifier meets a confidence threshold;
storing the association of the first identifier to the second identifier in a mapping of first identifiers to second identifiers only if the association meets the confidence threshold; and
for each mapping of a first identifier to a second identifier, associating particular records that include the first identifier from the first log file with particular records that include the second identifier from the second log file.

12. The system of claim 11, wherein:
the first user device event is an advertisement presentation of an advertisement, and each record in the first log files includes a timestamp, a uniform resource locator (URL), and an internet protocol (IP) address of a user device, and the first identifier is an identifier that identifies the user device to an advertisement server that serves advertisements;
the second user device event is a browsing history records, and each record in the second log files includes a timestamp, a URL, and an IP address of the a user device, and the second identifier is an identifier that identifies the user device to system that collects browsing history events of user devices.

13. The system of claim 11, wherein associating particular records that include the first identifier from the first log file with particular records that include the second identifier from the second log file comprises:
generating second join data defining second joins of records in the first log file to records in the second log file, wherein each second join describes a join of a particular record in the first log file to a particular record in the second log file by an association of the first identifier of the particular record in the first log file to the second identifier of the particular record of the second log file;
wherein each association described by each second join is an association stored in the mapping of first identifiers to second identifiers.

14. The system of claim 11, wherein the data processing apparatus is configured to perform operations comprising:
determining that the association of the first identifier to the second identifier meets the confidence threshold when the association of the first identifier to the second identifier is unique among the associations of first identifiers to second identifier in the first join data.

15. The system of claim 11, wherein data processing apparatus is further configured to determine whether the association of the first identifier to the second identifier meets the confidence threshold by performing the operations comprising:
determining multiple associations for a first identifier to two or more second identifiers;
determining a dominant association of the first identifier to only one of the two or more second identifiers; and
determining that the only domination association of the first identifier to the only one of the two or more second identifiers meets the confidence threshold.

16. The system of claim 11, wherein each of the first identifiers and second identifiers have respective identifier lifetimes.

17. The system of claim 16, wherein data processing apparatus is further configured to determine whether an association of a first identifier to a second identifier meets a confidence threshold by performing the operations comprising:
determining whether an association of a first identifier to a second identifier meets a confidence threshold comprises:
determining a lifetime overlap from the respective identifier lifetimes of a first identifier associated with a second identifier in the first join data; and
analyzing only the records in the first and second log files with respective timestamps that occur within the lifetime overlap.

18. A computer program product, encoded on a storage device including instructions operable to cause one or more computers to perform operations comprising:
receiving first join data defining first joins of records in a first log file to records in a second log file, wherein:
each record in the first log file describes a first user device event and includes a first identifier that identifies a user device;
each record in the second log file describes a second user device event and includes a second identifier that identifies a user device; and
each first join describes a join of a particular record in the first log file to a particular record in the second log file by an association of the first identifier of the particular record in the first log file to the second identifier of the particular record of the second log file, and represents the first type of user event of the particular record of the first log file and the second type of user event of the particular record of the second log file occurring at a particular user device, and wherein the first identifier and second identifiers are different identifiers;

for each association of a first identifier to a second identifier:
  determining whether the association of the first identifier to the second identifier meets a confidence threshold;
  storing the association of the first identifier to the second identifier in a mapping of first identifiers to second identifiers only if the association meets the confidence threshold; and
for each mapping of a first identifier to a second identifier associating particular records that include the first identifier from the first log file with particular records that include the second identifier from the second log file.

19. The computer program product of claim 18, wherein associating particular records that include the first identifier from the first log file with particular records that include the second identifier from the second log file comprises:
  generating second join data defining second joins of records in the first log file to records in the second log file, wherein each second join describes a join of a particular record in the first log file to a particular record in the second log file by an association of the first identifier of the particular record in the first log file to the second identifier of the particular record of the second log file;
  wherein each association described by each second join is an association stored in the mapping of first identifiers to second identifiers.

20. The computer program product of claim 18, wherein determining whether the association of the first identifier to the second identifier meets the confidence threshold comprises:
  determining multiple associations for a first identifier to two or more second identifiers;
  determining a dominant association of the first identifier to only one of the two or more second identifiers; and
  determining that the only domination association of the first identifier to the only one of the two or more second identifiers meets the confidence threshold.

* * * * *

UNITED STATES PATENT AND TRADEMARK OFFICE
CERTIFICATE OF CORRECTION

PATENT NO. : 8,364,682 B1
APPLICATION NO. : 13/101213
DATED : January 29, 2013
INVENTOR(S) : Ori Gershony It is certified that error appears in the above-identified patent and that said Letters Patent is hereby corrected as shown below:

On the Title Page

In Other Publications, Line 1, Column 2, delete "a.," and insert -- al., --, therefor.

In the Claims

In Claim 3, Line 6, Column 18, after "the" delete "a", therefor.

In Claim 12, Line 58, Column 19, after "the" delete "a", therefor.

Signed and Sealed this
Twenty-first Day of May, 2013

Teresa Stanek Rea
*Acting Director of the United States Patent and Trademark Office*